Figure 1:
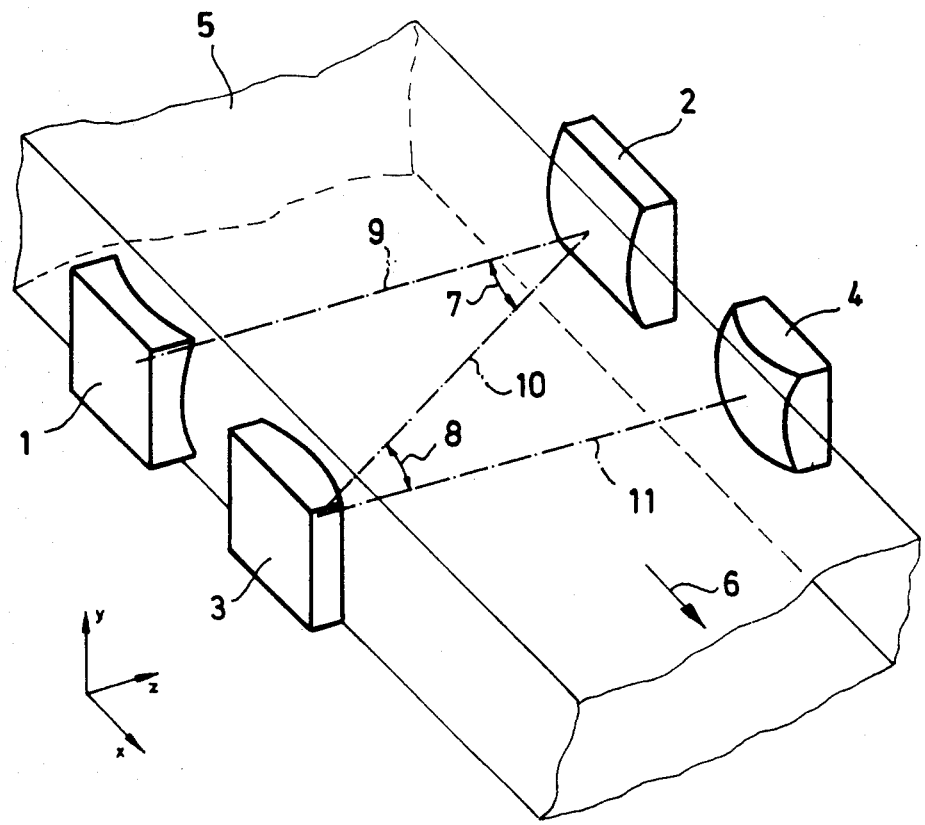

United States Patent [19]

Hoffmann

[11] Patent Number: 4,491,950
[45] Date of Patent: Jan. 1, 1985

[54] UNSTABLE LASER RESONATOR

[75] Inventor: Peter Hoffmann, Bernried, Fed. Rep. of Germany

[73] Assignee: Deutsche Forschungs- und Versuchsanstalt fur Luft- und Raumfahrt E.V., Fed. Rep. of Germany

[21] Appl. No.: 329,509

[22] Filed: Dec. 10, 1981

[51] Int. Cl.³ ............................................... H01S 3/08
[52] U.S. Cl. ....................................... 372/95; 372/99; 372/107; 372/93
[58] Field of Search ................. 372/95, 101, 107, 108, 372/98–100, 92, 93

[56] References Cited

U.S. PATENT DOCUMENTS 4,079,340  3/1978  Weiner et al. ........................ 372/95

OTHER PUBLICATIONS

Cason et al.; "Unstable Optical Resonators With Tilted Spherical Mirrors"; Optics Letters, vol. 2, No. 6; Jun. 1978, pp. 145 to 147.

Primary Examiner—James W. Davis
Assistant Examiner—Léon Scott, Jr.
Attorney, Agent, or Firm—Stephenson & Boller

[57] ABSTRACT

An unstable laser resonator having two spherical mirrors for producing a collimated output beam with rotationally unsymmetrical magnification characterized by the inclusion between the two spherical mirrors of at least two other optical elements with cylindrical surfaces and wherein the cylindrical axes of said cylindrical surfaces are essentially perpendicular to each other. These other two optical elements may be mirrors or lenses.

15 Claims, 8 Drawing Figures

UNSTABLE LASER RESONATOR

The invention concerns an unstable laser resonator with two spherical mirrors for producing a collimated output beam with rotationally unsymmetrical magnification.

Lasers with active media flowing perpendicularly to the resonator, in particular gas-dynamic and chemical lasers in which the active medium flows at supersonic velocities, exhibit small signal gain gradients and saturation behaviour gradients that differ along the flow and perpendicular to the flow.

The large active volume of such a laser requires a resonator with large mode volumes to achieve optimal power extraction. In addition, numerous applications require a laser beam with as little divergence as possible. These contradictory requirements are best fulfilled by the use of an unstable resonator and/or single or multiple folding of the light path in the resonator with repeated passage through the active medium. Such an unstable resonator contains a main reflection surface at one end of the resonator and a small reflection surface at its other end. These reflection surfaces are arranged in such a manner that during repeated passage between the mirrors the radiation drifts away from the optical axis defined by the two reflection surfaces and finally passes the smaller reflection surface to emerge from the resonator. The quantity of radiation emerging, and accordingly the coupling, is dependent upon the geometrical dimensions of the two reflection surfaces.

A collimated output beam is obtained through the use of a confocal, unstable resonator; with this type of construction the number of optical elements required for further use of the output beam is reduced.

Even better utilization of the laser-active medium is achieved while adhering to the stated secondary conditions if the magnitudes of the magnification in the direction of flow $m_x$ and that perpendicular to the latter, $m_y$, assume different values. Magnification m is defined for circular mirrors in a confocal resonator as the ratio of the aperture of the concave mirror to that of the convex mirror, and geometric coupling is defined as the ratio of the area of the coupled mode ring to the total cross-sectional area of the concave mirror. The relation between magnification and coupling is therefore $$K = 1 - \frac{1}{m^2}.$$

For rectangular mirrors magnification $m_x$ or $m_y$ may be defined in a similar manner, such that $m_x$ or $m_y$ represents a ratio of the lengths of the mirror edges in question in the x direction or the y direction perpendicular thereto. Then for the total coupling $$K = 1 - \frac{1}{m_x m_y}$$

and for the portion allotted to the mirror edge in question $$K_x = \frac{(1 + m_y)(m_x - 1)}{2 m_x m_y}$$

and $$K_y = \frac{(1 + m_x)(m_y - 1)}{2 m_x m_y}$$

with $$K = K_x + K_y.$$

Gas-dynamic lasers usually exhibit a large area of sufficiently high gain in the direction of flow, while perpendicular to the direction of flow, as a result of the formation of boundary layers on the channel walls, a gain profile develops that tends toward zero at these walls. A method of coupling radiation out of this medium is presented in U.S. patent specification No. 4,079,340. An unstable, confocal resonator with one convex and one concave laser mirror with spherical surfaces is modified in such a way that the axis of the laser beam and the resonator axis do not coincide, but are so inclined relative to each other that the quality of the resulting far field is optimized. The inclination of the optical axis results in displacement of the "shadow" of the convex mirror in the area of the merging beam, so that, by way of example, the emergence of the beam on the upstream edge of the convex mirror is amplified, and that on the downstream edge, on the other hand, is diminished. Improved beam properties may indeed be achieved in the far field by this means; however, this does not mean that the energy available in the medium is optimally extracted, since magnification remains the same in the direction of flow and perpendicular thereto.

A mirror arrangement is known (Optics Letters, Volume 2, No. 6, June 1978, pages 145 to 147) by which different magnifications are achieved in the direction of flow and perpendicular thereto by tilting spherical mirrors at considerable angles in relation to the resonator axis. In this manner it is possible to change the effective curvature of the mirror in one direction while the curvature perpendicular thereto remains unaltered. By selecting appropriate tilt angles and mirror radii, confocality may be maintained in both directions. In this method, however, the problem of the large image distortions that arise, in particular, coma compensation, has not proved to be soluble. For this reason, good radiation yields are obtained by varying the magnification in directions perpendicular to each other; on the other hand, the quality of the extracted radiation is greatly impaired.

In principle it would also be possible to obtain differing magnification with an unstable resonator that is constructed with cylindrical mirrors. While such cylindrical mirrors would show the desired behavior in one direction, their mirror surfaces would have to be arranged parallel with regard to the direction perpendicular thereto, i.e. they would function as a Fabry-Perot resonator with a magnification $m_y = 1$. Such an arrangement functions perfectly only if the mirror surfaces are adjusted strictly parallel, since otherwise the beam from the radiator drifts laterally. Such a resonator is therefore complex to keep in operation and, as a rule, unstable in operation.

In principle a resonator with differing magnification in different directions and good optical properties of extracted radiation could be achieved through the use of mirror surfaces that are ellipsoidally shaped, which therefore have different radii of curvature in directions perpendicular to one another. However, disproportionately high expenditures of time and money are required in their manufacture, taking into consideration the surface precision required in laser mirrors.

It is the task of the invention to create optical resonators with differing magnification in directions perpendicular to each other, with which a fully collimated laser beam may be produced, in which image distortions are to be avoided and construction of the resonator is to be so simple that neither complex adjustment nor the use of components that are difficult to manufacture is necessary.

This problem is solved according to the invention with an unstable resonator of the type described in the beginning as a result of the fact that between the spherical mirrors are arranged two other optical elements with cylindrical surfaces, whose cylindrical axes are essentially perpendicular to each other.

The use of two cylindrical surfaces makes it possible to adjust magnification differently in different directions, since the axes of the cylindrical elements are perpendicular to each other. This arrangment of the cylindrical elements also avoids the necessity of exact adjustment, since the two cylindrical mirrors working in co-operation with the spherical mirrors do not function as a Fabry-Perot resonator.

The optical elements are preferably mirrors; however, the use of lenses is also possible. In the latter case it is advantageous if such a cylindrical lens is designed at the same time as a window for the container of the active medium.

The light paths in the active medium may be lengthened by effecting one or more additional folds in the light path in question by introducing one or more plane mirrors.

It is advantageous if the distances between the optical elements are equal.

Provision may be made for the light path to penetrate the active medium only in the area between two consecutive optical elements.

In a preferred example of execution of the invention, provision is made for the optical elements to be arranged in such a manner that the entire light path lies in one plane; in this case it is preferable for all of the light beams to pass through the active medium.

In another execution example, a cylindrical mirror is arranged in such a way that the beam striking it forms an angle of approximately 45° with the normal to the cylindrical surface, and the cylindrical axis lies in the plane of incidence.

It is preferable for the curvatures of the optical elements and the distances between the latter to be so chosen that a collimated output beam is produced and the ratio of magnifications in different directions may be varied by proper selection of the distances between and/or the curvatures of the optical elements.

Preferred sets of geometric data for the arrangement proposed in the invention may be taken from the sub-claims.

Figure 2:
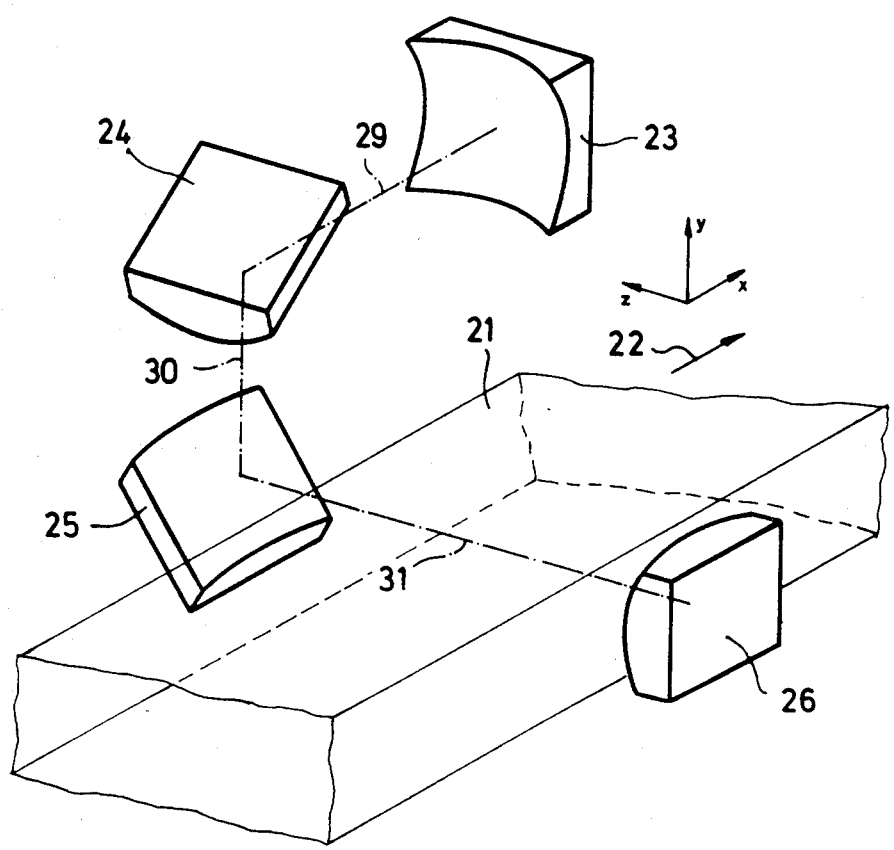
Figure 3:
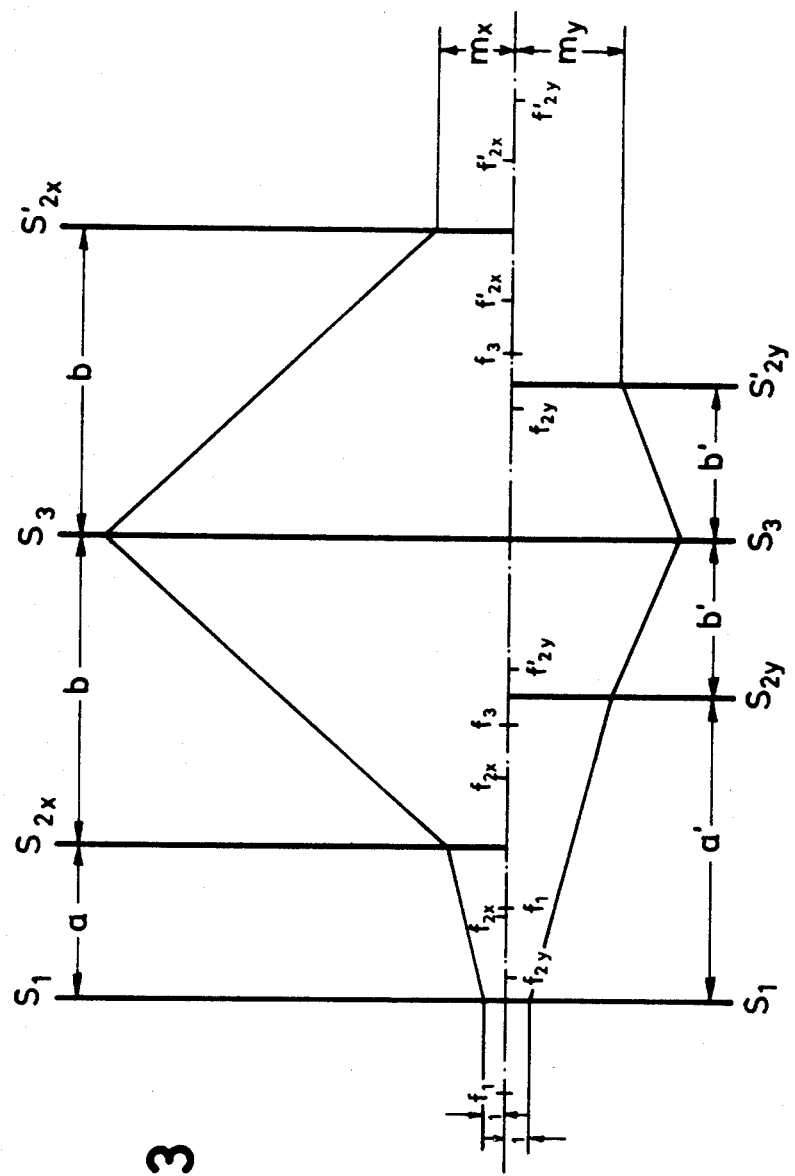
Figure 4:
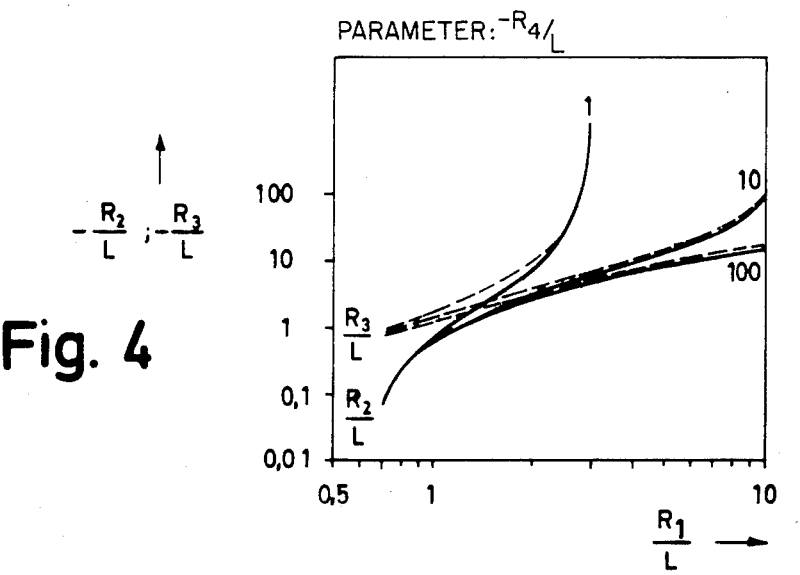
Figure 5:
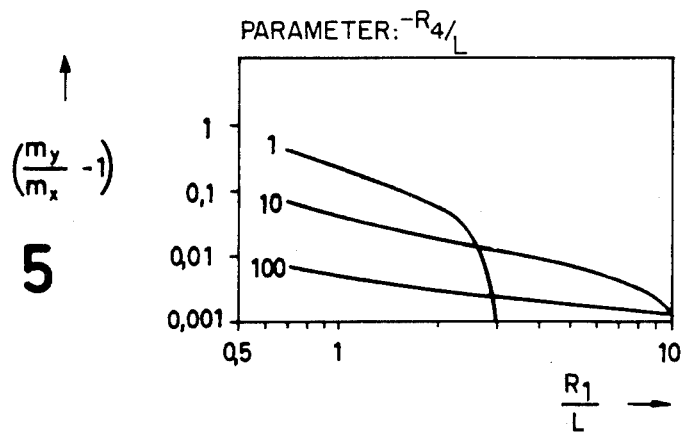
Figure 6:
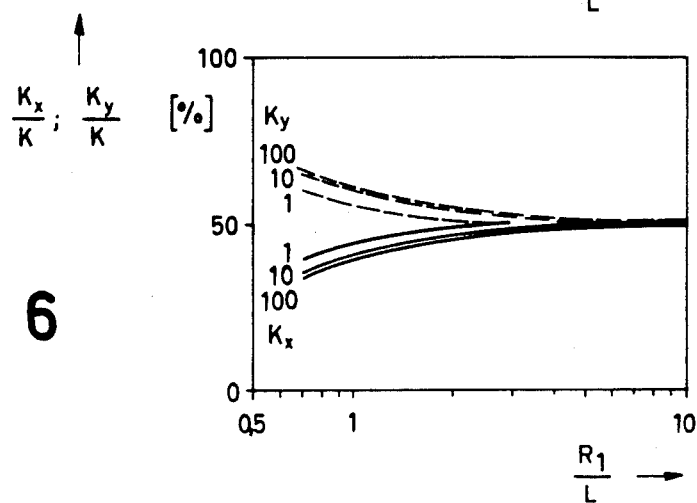
Figure 7:
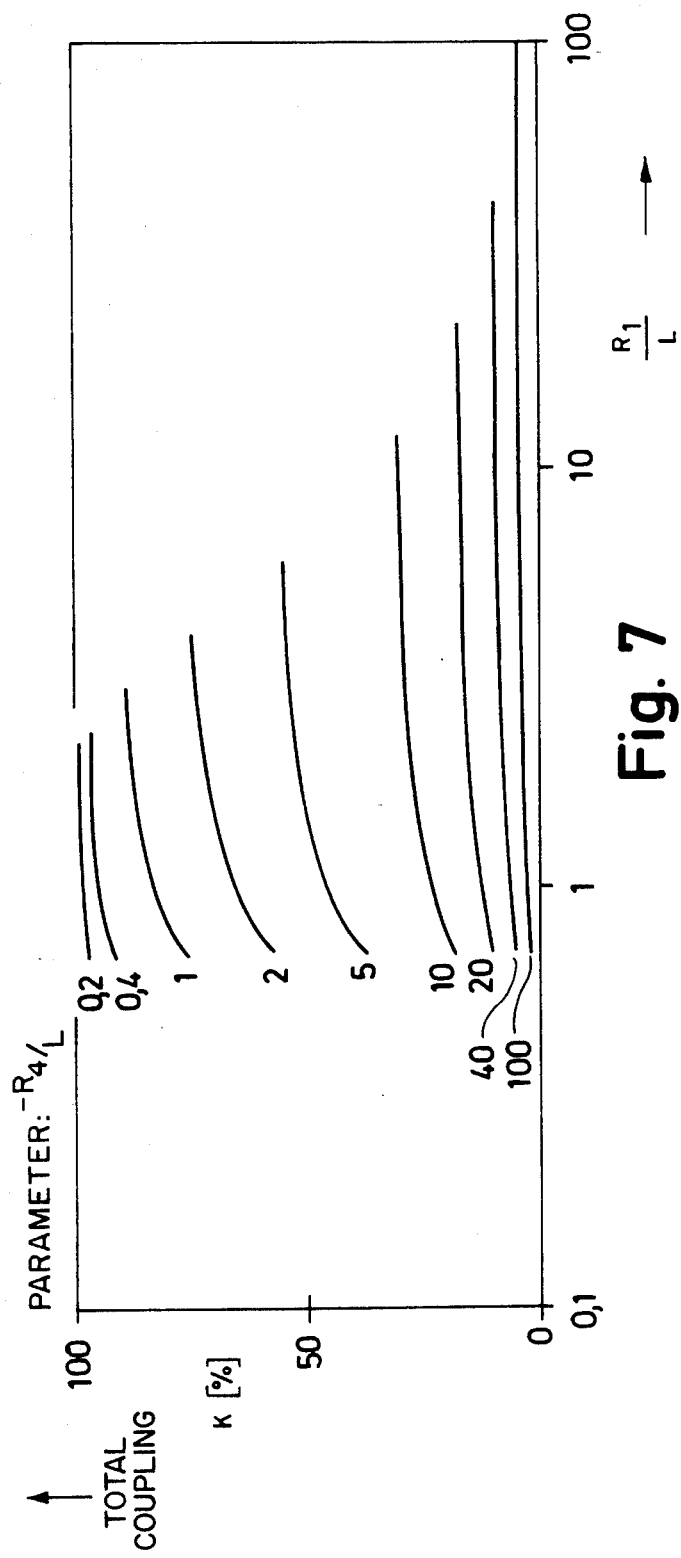
Figure 8:
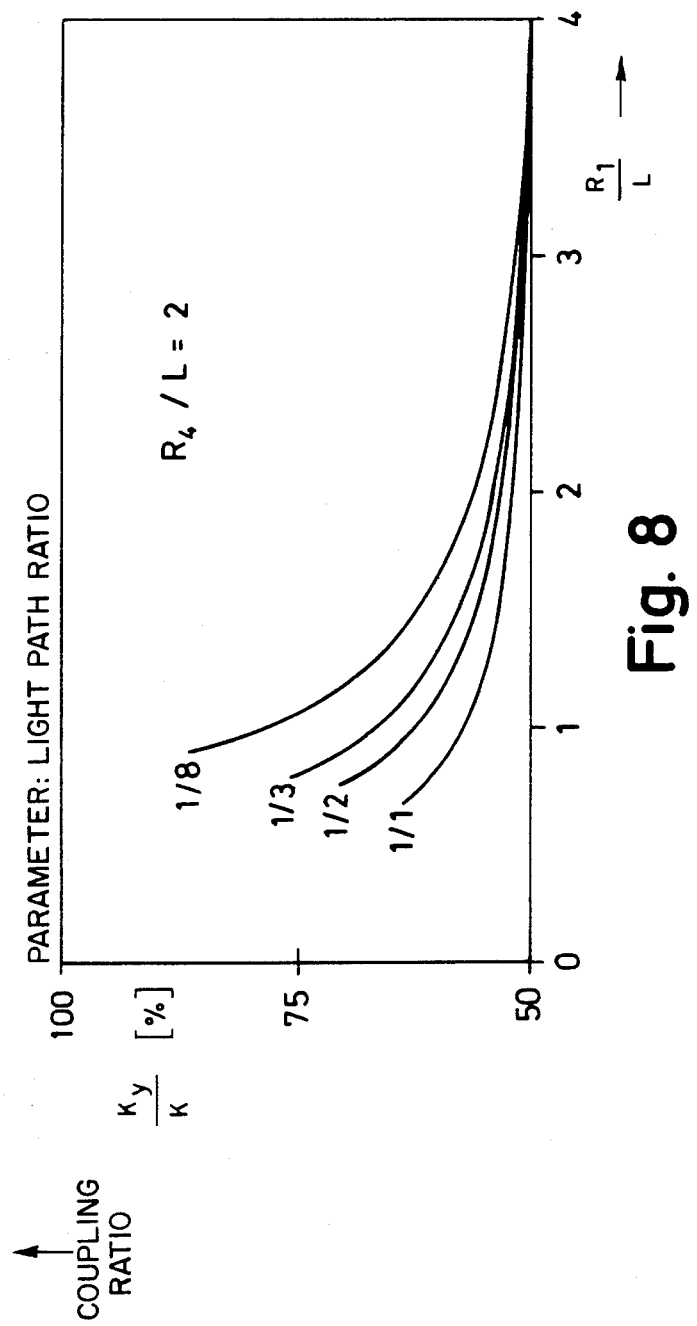

The following description of preferred types of execution of the invention, together with the illustrations, provides further details. Shown in the illustrations are:

FIG. 1 a schematic arrangement of the mirrors in a resonator designed in accordance with the invention;

FIG. 2 a schematic arrangement of mirrors of a modified execution example of a resonator in accordance with the invention;

FIG. 3 a diagram for explaining the determination of dimensioning of the optical elements in a resonator in accordance with the invention;

FIG. 4 in a diagram, the relationship of the curvatures of the optical elements of the invention resonator and the total light path L among them;

FIG. 5 in a diagram, the relationship of the ratio of magnifications in directions perpendicular to each other and the curvatures of the optical elements;

FIG. 6 in a diagram, the relation between the coupling in directions perpendicular to each other and the curvatures of the optical elements of the invention resonator;

FIG. 7 in a diagram, the relationship of the total coupling to the curvatures of the optical elements; and FIG. 8 in a diagram, the relationship of the coupling in one direction to the ratio of the distances, equal to each other, between a spherical and a cylindrical element and the distance between the two optical elements with cylindrical surfaces.

In FIG. 1 the construction of a laser resonator is represented schematically. In a channel 5 with rectangular cross-section, sketched only schematically, in the direction of the arrow 6 flows a laser-active medium - in a gas-dynamic laser, by way of example, a gas flowing at supersonic velocities excited by a high-frequency discharge, or in the case of a chemical laser, a gas undergoing a chemical reaction in the region of the resonator.

A spherical concave mirror 1 is arranged next to the channel 5, faced on the opposite side of the channel by a cylindrical, convex mirror 2, whose cylindrical axis is essentially parallel to the edges of the channel 5. Next to the concave mirror 1 is another cylindrical, convex mirror 3, whose cylindrical axis is essentially perpendicular to the cylindrical axis of the convex mirror 2. Facing the latter on the other side of the channel 5 is a spherical, convex mirror 4. The convex mirror 2 is arranged opposite the mirrors 1 and 3 in such a manner that the light from the mirror 1 strikes the mirror 3 at a small angle 7 and from there, at a similarly small angle 8, reaches the mirror 4, i.e. the angles of incidence of the beams 9 (between the mirrors 1 and 2), 10 (between the mirrors 2 and 3) and 11 (between the mirrors 3 and 4) are so small that no significant image distortions are produced due to the slanted light incidence upon the curved mirror surfaces.

In the execution example represented, the mirrors are arranged outside the channel 5; in this case the walls of the channel are designed in a suitable manner transparent to the radiation, by way of example, by providing appropriate windows in the side walls of the channel. It is also possible to arrange the mirrors inside the channel and to place an appropriate, transparent window only behind the mirror 4, so that the radiation can leave the channel in the area around mirror 4. Also shown in FIG. 1 is a system of coordinates which determines the designations of the directions; according to this coordinate system the flow of the active medium takes place in the positive x direction.

In FIG. 2 is represented a modified arrangement according to the invention. A channel 21 is flowed through by an active laser medium in the direction of the arrow 22 in the same manner as the channel 5 in the example of execution of FIG. 1. Here also are provided a spherical, concave mirror 23, a cylindrical, convex mirror 24, a second cylindrical, convex mirror 25 and a spherical, convex mirror 26; however, their arrangement differs from that shown in the execution example of FIG. 1. The spherical, convex mirror 26 lies with its spherical surface turned toward the channel 21, next to a side wall of the latter. Facing this mirror is the cylindrical, convex mirror 25, arranged such that the light beam 31 between the convex mirror 26 and the convex mirror 25 strikes the cylindrical surface of the convex mirror 25 at an angle of approximately 45° and the cylindrical axis of the mirror 25 lies in the angle of incidence of the beam 31. The cylindrical, convex mirror 24 is arranged such that its cylindrical axis is perpendicular to the cylindrical axis of the convex mirror 25, so that the light beam 30 strikes the convex mirror 24 at an angle of approximately 45°. The spherical, concave mirror 23 is arranged such that the light beam 29 between the mirror 23 and the mirror 24 is approximately parallel to the channel 21. While in the execution example shown in FIG. 1 the light beams 9, 10 and 11 run at least for the most part within the active medium, in the execution example of FIG. 2 only the light beam 31 is arranged for the most part within the active medium and the other light beams 30 and 29 are outside the active medium.

As in the execution example of FIG. 1, the mirrors 25 and 26 may also be located within the channel; then, for the emergence of the light beam 30, on the one hand, and for the emergence of the extracted beam in the area of the mirror 26, on the other, suitable passage facilities must be provided in the channel wall.

Here, too, a system of coordinates again indicates the designation of directions.

This second arrangement has the advantage that both the cross-section of the extracted radiation and the magnification ratio in the x and y directions may be optimally adjusted to the physical conditions in the laser-active medium without having to take into consideration other light paths in the active medium. In addition, with this configuration the light paths between the mirrors may be made very different in their lengths. If the cylindrical axes lie in the planes of the incident and reflected light beam as in the execution example presented, even large angles of incidence (here, approximately 45°) produce no image distortions.

With the arrangements described, by appropriate selection of the mirror spacings on the one hand and the curvatures of the mirrors on the other, a collimated output beam may be produced whose intensity is optimized and whose magnification is optimally adjusted to the physical conditions within the laser-active medium, i.e. whose magnification differs in directions x and y.

In the following, a brief outline is presented of the way in which a set of values for the curvatures of the mirrors and the distances separating the latter may be obtained, by which the requirements mentioned are fulfilled. For this purpose the reader is referred to FIG. 3. As already mentioned, the arrangement according to the invention is not limited to cylindrical mirrors; rather, in principle, the use of cylindrical lenses is also possible. In FIG. 3 is represented the geometrical beam path when lenses are used; here the lenses are designated consecutively. Above the dotted-and-dashed line is represented the beam path corresponding to the x direction, and below this line the beam path corresponding to the y direction. Each of these beams sees only one of the cylindrical mirrors (here, lenses) as a lense; the other cylindrical mirror (here, lense) functions as a plane mirror for the radiation and may be left out of account during consideration of the geometrical beam path.

In the following, the beam path in the x direction is explained with the help of the execution example shown in FIG. 1 in connection with the schematic representation of FIG. 3. Here, next to components of the arrangement in FIG. 1, the corresponding designations of FIG. 3 are indicated in parentheses.

A light beam parallel-incident upon the spherical, convex mirror 4 ($S_1$) is enlarged along the light path 11 (a). This radiation strikes the cylindrical, convex mirror 3 ($S_{2x}$) and is reflected by the cylindrical, convex mirror 2, which functions as a plane mirror and therefore does not appear in the light path in the x direction, to the spherical, concave mirror 1 ($S_3$), in the process of which further magnification takes place along the light paths 9 and 10 (b). After reflection at the mirror 1 ($S_3$), the light path is traversed in the opposite direction, in which process the radiation should be oriented parallel by the cylindrical, convex mirror 3 ($S'_{2x}$), since a collimated output beam is desired. The production of a collimated output beam is a physical condition which is taken as a basis for the determination of a set of curvature values and relative spacings.

Relationships among the focal lengths (curvatures) of the optical elements, their spacings and the magnification $m_x$ may be calculated with the help of the schematic illustration of FIG. 3 using the laws of geometrical optics. The magnification is shown visually here by the illustration of FIG. 3; a light beam with a radius 1 incident upon the spherical, convex mirror strikes the mirror 4 after traversing the entire light path with a radius magnified by the factor $m_x$.

The same calculation may be made for the beam path in the y direction; the corresponding optical elements and light paths are represented in FIG. 3 beneath the dotted-and-dashed line. The illustration differs from that in the x direction essentially in that the radiation in the y direction sees the mirror 3 as a plane mirror but undergoes magnification or concentration at mirror 2.

The relationship of the radii of curvature $R_2$ and $R_3$ of the cylindrical lenses 2 and 3 to the radius of curvature $R_1$ of the spherical, concave mirror 1 is plotted graphically in FIG. 4, in which different curves are drawn for different values of the radius of curvature $R_4$ of the mirror 4. All quantities $R_1$, $R_2$, $R_3$ and $R_4$ are normalized to the total light path L, i.e. to the sum of the light paths 9, 10 and 11 in the example of execution shown in FIG. 1. The curves are calculated in the manner described above, taking the diagram presented in FIG. 3 as a basis. Also taken as a basis is the fact that the light paths among the individual optical elements are equal, and that, using the designations of FIG. 3, the following relations obtain: $a = b/2$ and $a' = 2b'$.

The dashed curves show for different parameters $-R_4/L$ the relationship of the quantity $-R_3/L$ to the quantity $R_1/L$ and the unbroken curves indicate for the same parameters the relationship of the quantity $-R_2/L$ to the quantity $R_1/L$.

This illustration, with a given curvature of the mirror 1 and given curvature of the mirror 4, permits to determine the curvatures of the mirrors 2 and 3 required for producing a collimated output beam. The values of $R_1$ and $R_4$ may to a large degree be chosen freely; for each pair of $R_1$ and $R_4$, corresponding values of $R_2$ and $R_3$ are established. The ratio of magnifications $m_x$ and $m_y$, however, depends upon the selection of the quantities $R_1$ and $R_4$.

In FIG. 5 the relation $(m_y/m_x) - 1$ is plotted as a function of the quantity $R_1/L$. Here $-R_4/L$ is again selected as a parameter. This relation was also obtained from the calculation outlined above, where consideration was taken of the fact that the quantities $-R_2/L$ and $-R_3/L$ are produced automatically in selecting particular values of $R_1/L$ and $-R_4/L$.

If a certain ratio of the magnifications $m_x$ and $m_y$ is desired, given one of the quantities $R_1$ or $R_4$, one may determine the other from the relation shown in FIG. 5, and then the quantities $R_2$ and $R_3$ are produced automatically as a result of the relation shown in FIG. 4.

Plotted in FIG. 6 as a function of the quantity $R_1/L$ is the percentage fraction of the coupling $K_x/K$ and $K_y/K$ in the x and y directions. Here $-R_4/L$ is again selected as a parameter. This fraction is greatest for small radii of the cylindrical mirrors and the concave mirror but for large radii of the convex mirror; the ratio $K_y/K_x$ tends in the limiting case toward 2/1.

The total coupling K as a function of the quantity $R_1/L$ is plotted in FIG. 7, where $-R_4/L$ is again selected as a parameter. As in the other curves, the end points of the curves indicate a change of sign in the radius of one or both cylindrical mirrors; beyond this region one arrives at values, the use of which would not be physically meaningful.

In the diagrams of FIGS. 4 to 7, the relationships among the various quantities are plotted only for specific values of the parameter $-R_4/L$; of course, the curves plotted are only representative of the curves produced for other values of $-R_4/L$. For the relationships shown in FIGS. 4 to 7 the assumption was made that the distances between the individual pairs of mirrors are equal.

Especially with an arrangement as illustrated in FIG. 2, the relations among the distances between the individual optical elements may easily be varied. In this case as well, relations among the radii of the optical elements and the magnifications may be determined by starting out with a diagram similar to that shown in FIG. 3 that is modified in a manner corresponding to the different distances among the optical elements. In this process, relations are produced that correspond to those illustrated in FIGS. 4 to 7 for the case of equal distances among optical elements.

Plotted in FIG. 8 for a special case is the relationship of coupling in the y direction $K_y/K$ to the quantity $R_1/L$ when the quantity $R_4/L$ is constant and equal to $-2$. Selected as a parameter for the curves is the length ratio of the light path 29 or 31 to the light path 30 (cf. FIG. 2). With light paths of equal length (ratio 1:1), the greatest possible variation in the coupling is 2/3 to 1/3. With decreasing length ratio, the region of coupling variation increases. In some applications (chemical lasers) this increased variation is advantageous in optimizing the total coupling.

The employment in accordance with the invention of a resonator arrangement with two spherical and two cylindrical optical elements not only makes it possible to differentially select the magnification in different directions; one may also optimize the coupling in different directions and the total coupling at the same time by putting these elements together with appropriate dimensions. Determination of the necessary dimensions (radii of curvature and spacings) may be accomplished with the help of the considerations outlined, applying only the laws of geometrical optics and adhering to the stipulation that the coupled radiation must be collimated. The constructional design of the mirror arrangement is extremely simple; in particular, elements are employed that are easily manufactured and that do not require exacting adjustment.

I claim:

1. An unstable laser resonator including two spherical mirrors spaced apart and disposed about a laser active medium so as to provide a collimated output beam with rotationally unsymmetrical magnification, distinguished by the fact that in the light paths between the spherical mirrors are at least two other optical elements with cylindrical surfaces, whose cylindrical axes are essentially perpendicular to each other.

2. An unstable laser resonator in accordance with claim 1, distinguished by the fact that said optical elements are mirrors.

3. An unstable laser resonator in accordance with claim 1, distinguished by the fact that said optical elements are lenses.

4. An unstable laser resonator in accordance with claim 3, distinguished by the fact that at least one of said lenses simultaneously functions as a window for a container containing said active medium.

5. An unstable laser resonator in accordance with claim 1, distinguished by the fact that one or more of said light paths are lengthened as a result of the fact that one or more folds are effected in said light paths by introducing one or more plane mirrors.

6. An unstable laser resonator in accordance with claim 1, distinguished by the fact that said spherical mirrors and optical elements are so arranged that the individual light paths between said spherical mirrors and optical elements are equal.

7. An unstable laser resonator in accordance with claim 1, distinguished by the fact that the light paths penetrate said active medium only in the region between one of said optical elements and one of said spherical mirrors.

8. An unstable laser resonator in accordance with claim 1, distinguished by the fact that said optical elements and spherical mirrors are arranged in such a manner that the entire light path lies in one plane.

9. An unstable laser resonator in accordance with claim 1, distinguished by the fact that one of said optical elements is a cylindrical mirror arranged in such a manner that said beam striking it forms an angle of approximately 45° with the normal to the surface of said cylindrical, and the axis of said cylindrical lies in the plane of incidence.

10. An unstable laser resonator in accordance with claim 1, distinguished by the fact that the curvatures of the mirrors and optical elements and their spacings are so chosen that a collimated output beam is produced, and the ratio of magnifications in different directions may be varied by appropriate selection of the spacings and/or the curvatures of the mirrors and optical elements.

11. An unstable laser resonator in accordance with claim 10, distinguished by the fact that when said spherical mirrors and optical elements are so arranged that the individual light paths between said spherical mirrors and optical elements are equal, the relations indicated in FIG. 4 are established among their curvatures: where $R_1$ indicates the radius of one spherical, concave mirror, $R_2$ is the radius of one cylindrical, convex optical element, $R_3$ is the radius of another cylindrical, convex optical element, $R_4$ is the radius of another spherical, convex mirror, and L is the overall length of the light path, and where the values 1, 10 and 100 assigned to each pair of solid and broken line graph plots in the graph are for respective particular ratios of $-R_4/L$, the negative signs preceding the ratios $R_2/L$, $R_3/L$, and $R_4/L$ indicating that the respective optical element or mirror is convex.

12. An unstable laser resonator in accordance with claim 11, distinguished by the fact that the ratio of the magnifications ($m_x$, $m_y$) in directions perpendicular to each other result from the relations indicated in FIG. 5 in function of the quantities $R_1$ and $R_4$: where the values 1, 10, and 100 assigned to each solid line graph plot in the latter graph are for respective particular ratios of $-R_4/L$, the negative sign preceding the ratio $R_4/L$ indicating that the respective mirror is convex.

13. An unstable laser resonator in accordance with claim 12 distinguished by the fact that the total geometric coupling K between said spherical mirrors results from the relations indicated in FIG. 7 in function of the quantities $R_1$ and $R_4$: and where in the last of the three graphs the values 0.2, 0.4, 1, 2, 5, 10, 20, 40, and 100 assigned to each solid line graph plot are for respective particular ratios of $-R_4/L$, the negative sign preceding the ratio $R_4/L$ indicating that the respective mirror is convex.

14. An unstable laser resonator in accordance with claim 11 distinguished by the fact that the total geometric coupling K between said spherical mirrors results from the relations indicated in FIG. 7 in function of the quantities $R_1$ and $R_4$: where the values 0.2, 0.4, 1, 2, 5, 10, 20, 40, and 100 assigned to each solid line graph plot in the latter graph are for respective particular ratios of $-R_4/L$, the negative sign preceding the ratio $R_4/L$ indicating that the respective mirror is convex.

15. An unstable laser resonator in accordance with claim 1, wherein the direction of flow of said medium is in the x-direction and distinguished by the fact that the ratio of the geometric coupling, $K_y$ in the y direction which is perpendicular to the x-direction to the total geometric coupling K between said spherical mirrors as a function of the radius $R_1$ of one of said spherical mirrors to the light path between the cylindrical mirrors at a given radius $R_4$ of the other spherical mirror, when the path lengths between said spherical mirrors and said cylindrical optical elements are equal is given by the relations indicated in FIG. 8: where L signifies the overall light path and where the values $\frac{1}{8}$, $\frac{1}{3}$, $\frac{1}{2}$, and 1/1 assigned to each solid line graph plot in the graph are for respective particular ratios of $-R_4/L$, the negative sign preceding the ratio $R_4/L$ indicating that the respective mirror is convex.

* * * * *

UNITED STATES PATENT AND TRADEMARK OFFICE
CERTIFICATE OF CORRECTION

PATENT NO. : 4,491,950
DATED : January 1, 1985
INVENTOR(S) : Peter Hoffmann

It is certified that error appears in the above-identified patent and that said Letters Patent is hereby corrected as shown below:

In column 8, line 44 immediately before the comma, insert --mirror--; same line immediately before "lies", insert --mirror--.

Signed and Sealed this

Second Day of July 1985

[SEAL]

Attest:

DONALD J. QUIGG

Attesting Officer           Acting Commissioner of Patents and Trademarks